United States Patent [19]

Wallace et al.

[11] Patent Number: 4,969,683

[45] Date of Patent: Nov. 13, 1990

[54] VEHICLE SEAT PROTECTOR FOR TRANSPORTING ANIMALS

[76] Inventors: Walter H. Wallace; Beatrice Wallace, both of P.O. Box 5262, Katy, Tex. 77491

[21] Appl. No.: 397,261

[22] Filed: Aug. 23, 1989

[51] Int. Cl.[5] ............................................... A47C 1/08
[52] U.S. Cl. .................................... 297/250; 297/253; 297/218; 297/219
[58] Field of Search .............. 297/250, 253, 254, 218, 297/219, 397, 330, 331, 352

[56] References Cited

U.S. PATENT DOCUMENTS

| | | | |
|---|---|---|---|
| 1,882,485 | 10/1932 | Clements | 297/253 |
| 2,109,652 | 3/1938 | Sallop et al. | 297/253 |
| 2,119,023 | 5/1938 | Pickard | 297/253 |
| 3,185,523 | 5/1965 | Morrill, Jr. | 297/253 X |
| 4,206,945 | 6/1980 | Kifferstein | 297/397 X |

FOREIGN PATENT DOCUMENTS

| | | | |
|---|---|---|---|
| 13403 | of 1929 | Australia | 297/253 |
| 1519793 | 8/1978 | United Kingdom | 297/250 |

*Primary Examiner*—Laurie K. Cranmer
*Attorney, Agent, or Firm*—Kenneth A. Roddy

[57] ABSTRACT

A cushioned seat protector of resilient material has a protective fabric covering and is removably installed on existing vehicle seats for transporting pets and animals. The seat protector has a generally rectangular seat portion configured to substantially cover and be supported on the seat member of the existing vehicle seat and a generally rectangular back portion configured to substantially cover and be supported against the back rest member of the vehicle seat. A generally rectangular tail portion extends rearwardly from the adjacent longitudinal edges of the back portion and seat portion to be tucked into the gap between the seat member and back rest member of the existing vehicle seat to removably secure the seat protector on the existing vehicle seat. Straps may be provided on the seat protector back portion to be secured to a portion of the back rest member of the existing vehicle seat to removably secure the seat protector back portion against the existing vehicle seat back rest member. The soft resilient material on the bottom surfaces of the seat portion and back portion is exposed to frictionally engage the existing vehicle seat member and back member surfaces to reduce sliding of the seat protector on the existing seat surfaces when the weight of the animal is supported thereon. The seat protector provides a comfortable ride for the pet and prevents damage to the existing vehicle seat upholstery caused by the pet's claws or soiling of the upholstery by dirty pets.

8 Claims, 3 Drawing Sheets

VEHICLE SEAT PROTECTOR FOR TRANSPORTING ANIMALS

BACKGROUND OF THE INVENTION

1. Field of the Invention

This invention relates generally to vehicle seat protectors and cushions, and more particularly to a cushioned seat protector removably installed on the seats of vehicles for transporting animals.

2. Brief Description of the Prior Art

Devices are known which are used inside of vehicles for transporting pets. These devices are in the form of baskets, trays, cages, or pallets, and may contain a soft fabric cushion or pillow upon which the animal's body may rest. None of these devices have the novel construction to provide the utilitarian features of the present invention.

The present invention is distinguished over the prior art by a cushioned seat protector of resilient material which has a protective fabric covering and is removably installed on existing vehicle seats for transporting pets and animals. The seat protector has a generally rectangular seat portion configured to substantially cover and be supported on the seat member of the existing vehicle seat and a generally rectangular back portion configured to substantially cover and be supported against the back rest member of the vehicle seat. A generally rectangular tail portion extends rearwardly from the adjacent longitudinal edges of the back portion and seat portion to be tucked into the gap between the seat member and back rest member of the existing vehicle seat to removably secure the seat protector on the existing vehicle seat. Straps may be provided on the seat protector back portion to be secured to a portion of the back rest member of the existing vehicle seat to removably secure the seat protector back portion against the existing vehicle seat back rest member. The soft resilient material on the bottom surfaces of the seat portion and back portion is exposed to frictionally engage the existing vehicle seat member and back member surfaces to reduce sliding of the seat protector on the existing seat surfaces when the weight of the animal is supported thereon. The seat protector provides a comfortable ride for the pet and prevents damage to the existing vehicle seat upholstery caused by the pet's claws or soiling of the upholstery by dirty pets.

SUMMARY OF THE INVENTION

It is therefore an object of the present invention to provide a vehicle seat protector which may be removably installed on existing vehicle seats to protect the seat and back rest portions of the vehicle seat while transporting animals.

It is another object of this invention to provide a vehicle seat protector which is cushioned to afford a comfortable ride for animals being transported on existing vehicle seats.

Another object of this invention is to provide a vehicle seat protector which may be repeatedly easily and quickly installed on existing vehicle seats for transporting animals and is easily and quickly removed and shaken out to remove hair, dirt, and other debris.

A further object of this invention is to provide a vehicle seat protector which has soft resilient material on the bottom surfaces of the seat portion and back portion to frictionally engage the existing vehicle seat member and back member surfaces to reduce sliding of the seat protector on the existing seat surfaces when the weight of the animal is supported thereon.

A still further object of this invention is to provide a vehicle seat protector which is simple in construction, economical to manufacture, and rugged and durable in use.

Other objects of the invention will become apparent from time to time throughout the specification and claims as hereinafter related.

The above noted objects and other objects of the invention are accomplished by a cushioned seat protector of resilient material which has a protective fabric covering and is removably installed on existing vehicle seats for transporting pets and animals. The seat protector has a generally rectangular seat portion configured to substantially cover and be supported on the seat member of the existing vehicle seat and a generally rectangular back portion configured to substantially cover and be supported against the back rest member of the vehicle seat. A generally rectangular tail portion extends rearwardly from the adjacent longitudinal edges of the back portion and seat portion to be tucked into the gap between the seat member and back rest member of the existing vehicle seat to removably secure the seat protector on the existing vehicle seat. Straps may be provided on the seat protector back portion to be secured to a portion of the back rest member of the existing vehicle seat to removably secure the seat protector back portion against the existing vehicle seat back rest member. The soft resilient material on the bottom surfaces of the seat portion and back portion is exposed to frictionally engage the existing vehicle seat member and back member surfaces to reduce sliding of the seat protector on the existing seat surfaces when the weight of the animal is supported thereon. The seat protector provides a comfortable ride for the pet and prevents damage to the existing vehicle seat upholstery caused by the pet's claws or soiling of the upholstery by dirty pets.

DESCRIPTION OF THE PREFERRED EMBODIMENT

Figure 1:
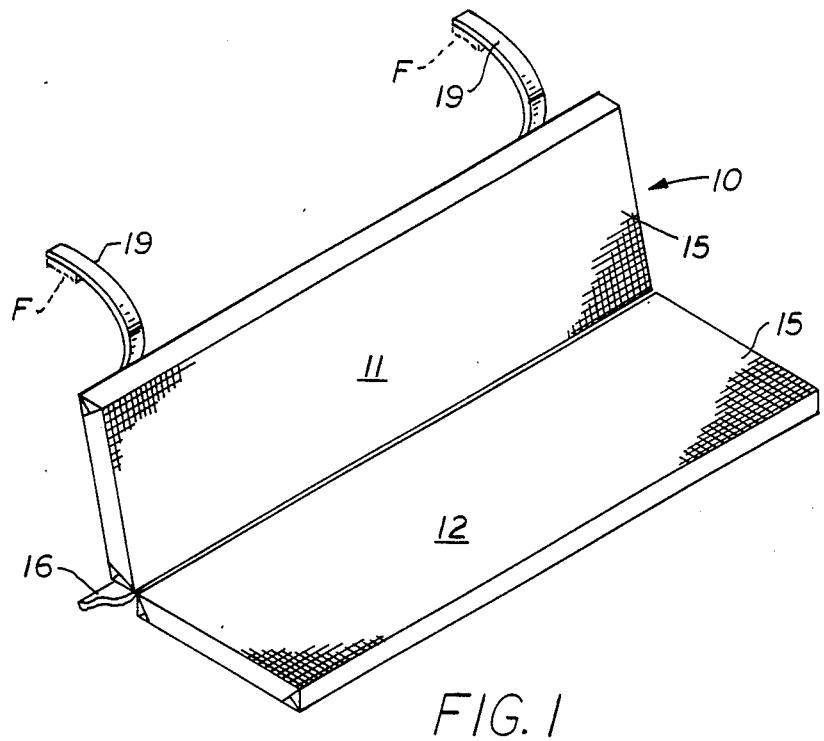
FIG. 1 is an isometric view of a foldable seat protector in accordance with the present invention.
Figure 2:
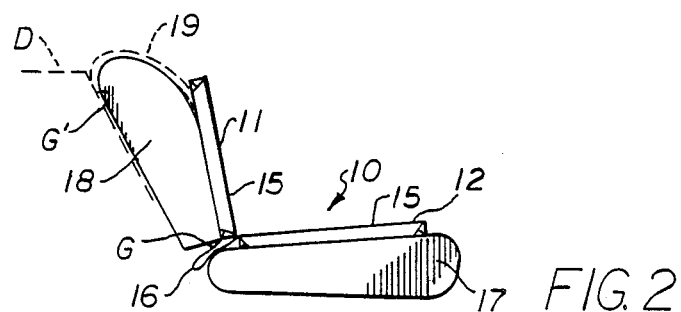
FIG. 2 is a side elevation of the seat protector of FIG. 1 installed on the existing seat of a vehicle.
Figure 3:
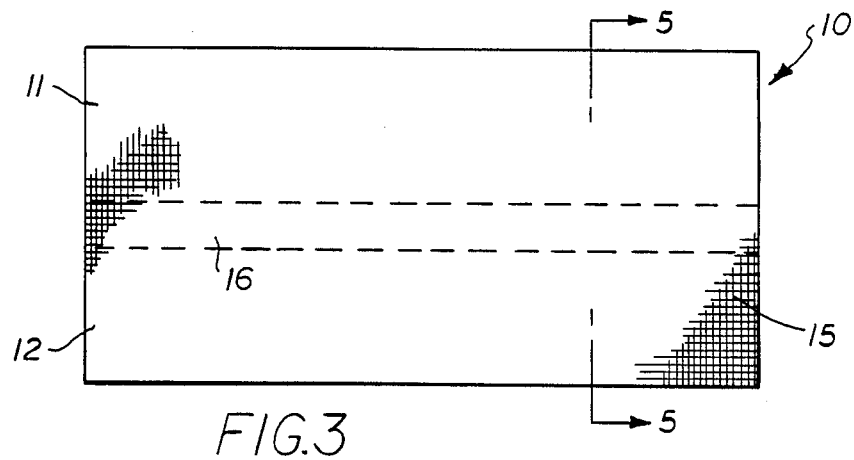
FIG. 3 is a top plan view of the seat protector of FIG. 1 in a flat extended position.

Referring to the drawings by numerals of reference, there is shown in FIG. 1–5, a preferred seat protector 10. The seat protector 10 comprises back portion 11 and a seat portion 12. The back and seat portions 11 and 12 are formed of rectangular sheets 13 and 14 of soft resilient material such as foam rubber which are approximately equal in length. The top surface of the sheets 13 and 14 are covered with a suitable fabric material 15 which is secured thereon such that the sheets 13 and 14 are spaced approximately one foot apart in a substantially parallel relation. The portion of the fabric 15 which spans the distance between the sheets 13 and 14 serves as a tail 16 which is tucked or pushed into the gap G between the seat member 17 and back rest member 18 of the existing vehicle seat. The fabric material may be any suitable material such as flannelet or the like, and may be formed of natural or synthetic fiber in whole or in part, and may be woven, knitted, etc.

Figure 4:
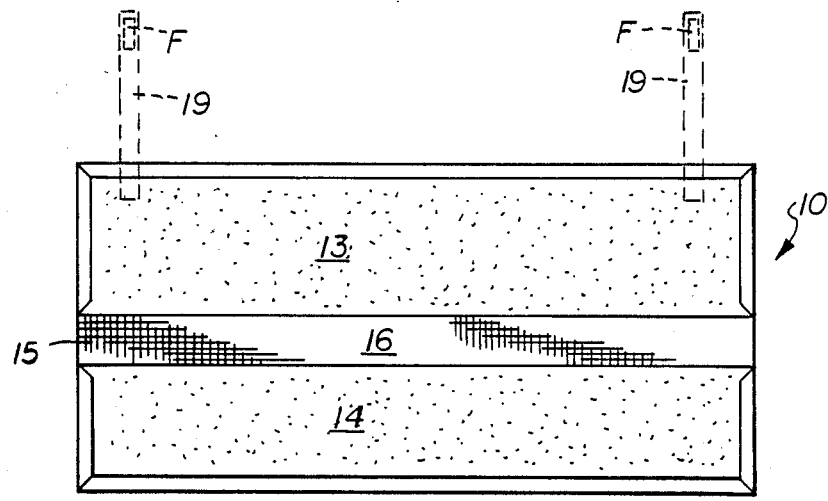
FIG. 4 is a bottom plan view of the seat protector of FIG. 1 in the flat extended position.
Figure 5:
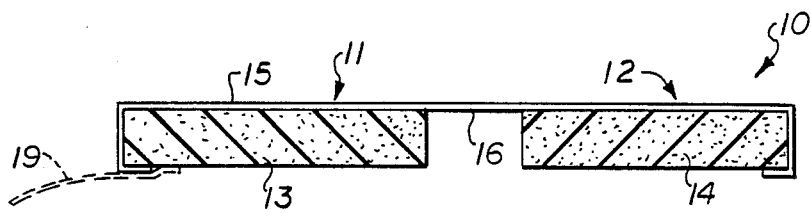
FIG. 5 is a cross section view of the seat protector taken along line 5—5 of FIG. 3.

The fabric material 15 is secured to the top surface of the sheets 13 and 14 by conventional means, such as gluing and may be folded over the peripheral edges of the sheets 13 and 14 and secured to their bottom surfaces to cover the exterior side edges of the seat protector (FIGS. 4 and 5). It is preferred that the bottom surfaces of the resilient sheets 13 and 14 remain substantially uncovered, except for where the fabric 15 is secured for providing frictional engagement with the existing vehicle seat surfaces to reduce sliding of the seat protector 10 on the existing vehicle seat surfaces when the animal is carried thereon.

Elongate straps 19 may also be provided on the back portion 11 of the seat protector 10. Suitable strap members 19 comprise a pair of thin straps of flexible material each secured at one end to the bottom surface of the rectangular sheet 13 of the back portion 11 by conventional means such as gluing. The free ends of the straps 19 may be tucked or pushed into the gap G' between the back rest member 17 and the rear deck D of the existing vehicle seat. The straps may also be tied or otherwise removably attached about the head rest portion of an existing vehicle seat. It should be understood, that the free ends of the straps 19 may also be provided with mating elements of a fabric hook and loop type fastener F for securing the straps about the head rest.

When the fabric tail portion 16 of the seat protector 10 is pushed into the gap G between the seat and back rest members 17 and 18 of the existing vehicle seat, the back portion 11 and seat portion 12 of the seat protector 10 are drawn together to form an L-shaped configuration closely following the general angular shape of the existing vehicle seat. The back portion 11 is secured in the upright position against the back rest 18 of the existing seat by tucking or pushing the free ends of the straps 19 into the gap G' between the back rest 18 and the rear deck D of the existing vehicle seat, or if head rests are available, by fastening the straps about the head rest portion of the existing vehicle seat.

Figure 6:
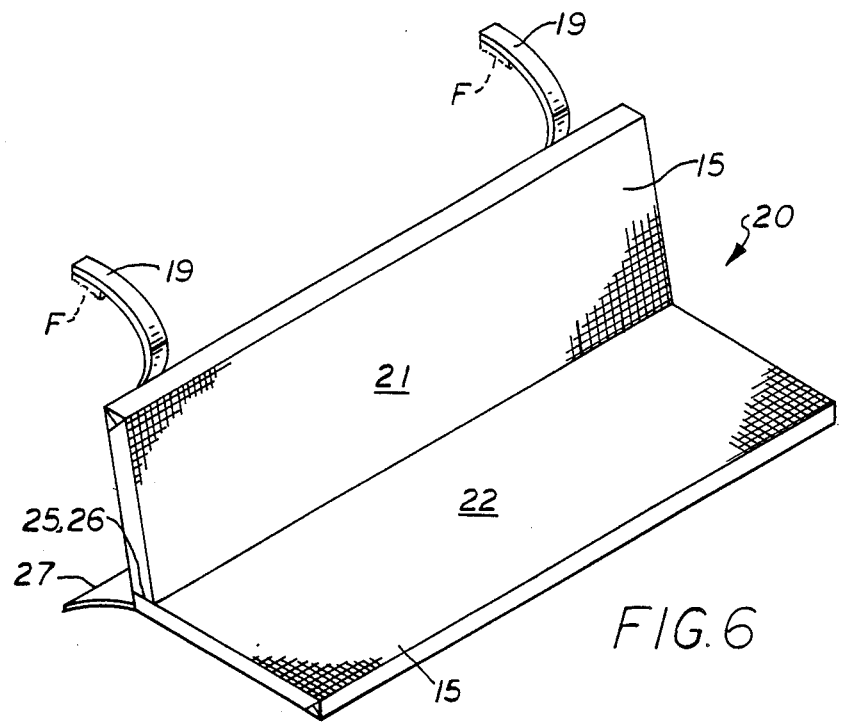
FIG. 6 is an isometric view of an L-shaped seat protector in accordance with the present invention.
Figure 7:
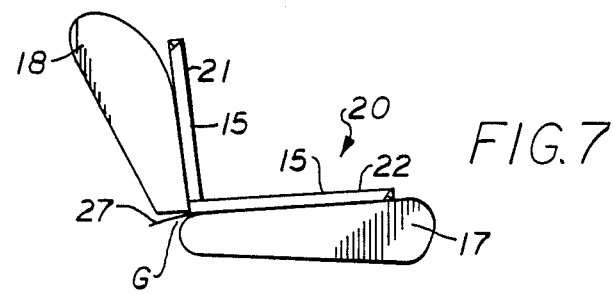
FIG. 7 is a side elevation of the L-shaped seat protector of FIG. 6 installed on the existing seat of a vehicle.
Figure 8:
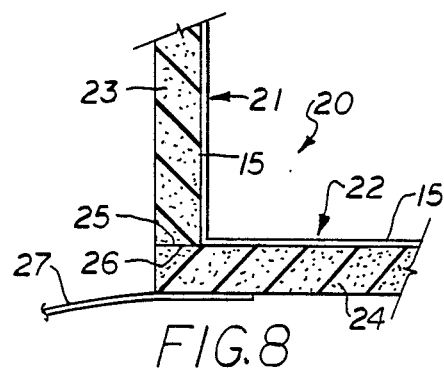
FIG. 8 is a partial cross section view of the L-shaped seat protector taken along line 8—8 of FIG. 6.

Referring now to FIGS. 6–8, an alternate embodiment 20 of the seat protector is shown. The seat protector 20 comprises a back portion 21 and a seat portion 22 which are permanently secured together in an L-shaped configuration. The back and seat portions 21 and 22 are formed of rectangular sheets 23 and 24 of soft resilient material such as foam rubber which are approximately equal in length. The adjacent longitudinal edges 25 and 26 of the sheets 23 and 24 are secured together in a generally perpendicular relation by conventional means such as gluing. The top surface of the sheets 23 and 24 are covered with a suitable fabric material 15. The fabric material may be any suitable material such as flannelet or the like, and may be formed of natural or synthetic fiber in whole or in part, and may be woven, knitted, etc. A rectangular strip 27 of flexible material approximately one foot wide has one longitudinal edge secured to the rear underside of the seat portion 22 by conventional means such as gluing and the remaining portion extends outwardly therefrom to serve as a tail 27 which is tucked or pushed into the gap G between the seat and back rest members of the existing vehicle seat.

The fabric material 15 is secured to the top surface of the sheets 23 and 24 by conventional means, such as gluing and may be folded over the peripheral edges of the sheets and secured to their bottom surfaces to cover the exterior side edges of the seat protector, as previously described. It is preferred that the bottom surfaces of the resilient sheets 23 and 24 remain substantially uncovered, except for where the fabric is secured for providing frictional engagement with the existing vehicle seat surfaces to reduce sliding of the seat protector 20 on the existing seat surfaces when the animal is carried thereon.

Elongate straps 19 may also be provided on the back portion 21 of the seat protector 20. As described previously, suitable strap members 19 comprise a pair of thin straps of flexible material each secured at one end to the bottom surface of the rectangular sheet 23 of the back portion 21 by conventional means such as gluing. The free ends of the straps 19 may be tucked or pushed into the gap between the back rest member 17 and the rear deck D of the existing vehicle seat. The straps may also be tied or otherwise removable attached about the head rest portion of an existing vehicle seat. It should be understood, that the free ends of the straps 19 may also be provided with mating elements of a fabric hook and loop type fastener F for securing the straps about the head rest.

With the L-shaped embodiment of FIGS. 6–8, the seat protector 20 is placed in the back seat of the vehicle, and the tail 27 is tucked or pushed into the gap G between the seat and back rest members 17 and 18 of the existing vehicle seat. In this embodiment, the seat protector remains in a generally L-shaped configuration when the tail portion 27 is pushed into the gap between the seat and back rest members of the existing vehicle seat, and the straps 19 would be optional. However, if they are used, the back portion 21 may be secured against the back rest 17 of the existing seat by tucking or pushing the free ends of the straps 19 into the gap between the back rest portion and the rear deck of the existing vehicle seat, or if head rests are available, by fastening the straps about the head rest portion of the existing vehicle seat.

OPERATION

To use the folding seat protector 10, the back portion 11 and seat portion 12 may be folded down on one another and placed on the vehicle rear seat. The portion of the fabric 15 which spans the distance between the sheets 13 and 14 serves as a tail 16 is tucked or pushed into the gap G between the seat and back rest members 17 and 18 of the existing vehicle seat.

When the tail portion 16 is pushed into the gap G between the seat and back rest members 17 and 18 of the existing vehicle seat, the back and seat portions 11 and 12 of the seat protector 10 are drawn together to form an L-shaped configuration closely following the general angular shape of the existing vehicle seat. The back portion 11 is secured in the upright position against the back rest of the existing seat by tucking or pushing the free ends of the straps 19 into the gap G' between the back rest member 17 and the rear deck D of the existing vehicle seat, or if head rests are available, by fastening the straps about the head rest portion of the existing vehicle seat. The animal may then be placed on the seat protector.

With the L-shaped embodiment of FIGS. 6-8, the seat protector 20 is placed in the back seat of the vehicle, and the tail 27 is tucked or pushed into the gap G between the seat and back rest members 17 and 18 of the existing vehicle seat.

The resilient material and fabric cover of the seat protector provides the pet with a comfortable cushion while preventing damage to the existing vehicle seat upholstery caused by the animal's claws or soiling of the upholstery by animals. The exposed resilient material on the bottom surface of the seat portion and back portion frictionally engage the existing vehicle seat surfaces and reduce sliding of the seat protector on the existing seat surfaces when the weight of the animal is supported thereon.

After the animal has been transported, the seat protector is easily and quickly removed by simply unfastening the straps and pulling the tail from the gap of the existing seat. The seat protector may then be shaken out to remove hair, dirt, and other debris.

While this invention has been described fully and completely with special emphasis upon several preferred embodiments, it should be understood that within the scope of the appended claims the invention may be practiced otherwise than as specifically described herein.

We claim:

1. A seat protector for removable installation on existing vehicle seats which have a seat member and a back rest member to protect the existing seat and back members while transporting animals thereon, the seat protector comprising:
    a generally rectangular seat portion formed of soft resilient material configured to substantially cover and be supported on the seat member of an existing vehicle seat,
    a generally rectangular back portion formed of soft resilient material configured to substantially cover and be supported against the back rest member of an existing vehicle seat, and
    a protective fabric cover covering the top surface of said seat and back portions and leaving the soft resilient material on the bottom surfaces of said seat portion and said back portion substantially uncovered to frictionally engage the existing vehicle seat and back member surfaces and reduce sliding of said seat protector on the vehicle seat surfaces when the weight of the animal is supported thereon,
    said seat and back portions being spaced apart and connected by said protective fabric cover to form a generally rectangular portion of said protective cover which spans a longitudinal space between said seat and back portions such that said seat and back portions may be placed in generally perpendicular relation, whereby
    said portion of said protective cover which spans the longitudinal space between said seat and back portions forms a generally rectangular tail portion extending rearwardly from the adjacent longitudinal edges of said back portion and said seat portion of sufficient width to be frictionally received and engaged within the gap between the seat member and back rest member of the existing vehicle seat to removably secure said seat protector to the existing vehicle seat.

2. A seat protector according to claim 1 including strap means secured to said seat protector back portion and extending outwardly therefrom and adapted to be secured to a portion of the back rest member of the existing vehicle seat to removably secure said seat protector back portion against the existing vehicle seat back rest member.

3. A seat protector according to claim 2 in which said strap means comprises a plurality of elongate thin straps of flexible material each secured at one end to said back portion and their free ends adapted to be tucked or pushed into the gap between the back rest member and the rear deck of the existing vehicle seat.

4. A seat protector according to claim 2 in which said strap means comprises a plurality of elongate thin straps of flexible material each secured at one end to said back portion and their free ends adapted to be fastened about the head rest portion of the existing vehicle seat.

5. A seat protector according to claim 4 in which the free ends of said straps are provided with mating elements of a fabric hook and loop type fastener for securing the straps about the head rest.

6. A seat protector according to claim 1 including strap means secured to said seat protector back portion and extending outwardly therefrom and adapted to be secured to a portion of the back rest member of the existing vehicle seat to removably secure said seat protector back portion against the existing vehicle seat back rest member.

7. A seat protector according to claim 1 in which said seat portion and said back portion are formed of rectangular sheets of soft resilient material, said rectangular sheets are joined together along adjacent longitudinal edges in generally perpendicular relation, and
    said tail portion comprises a rectangular strip of flexible material having one longitudinal side secured to the underside of said seat portion near its juncture with said back portion and the remaining portion of the strip extending outwardly therefrom, whereby when said joined seat and back portions are placed on the existing vehicle seat said tail portion extends rearwardly from the joined longitudinal edges of said back portion and said seat portion to be frictionally received and engaged within the gap between the seat member and back rest member of the existing vehicle seat to removably secure said seat protector to the existing vehicle seat.

8. A seat protector according to claim 7 including strap means secured to said seat protector back portion and extending outwardly therefrom and adapted to be secured to a portion of the back rest member of the existing vehicle seat to removably secure said seat protector back portion against the existing vehicle seat back rest member.

* * * * *